Figure 1:
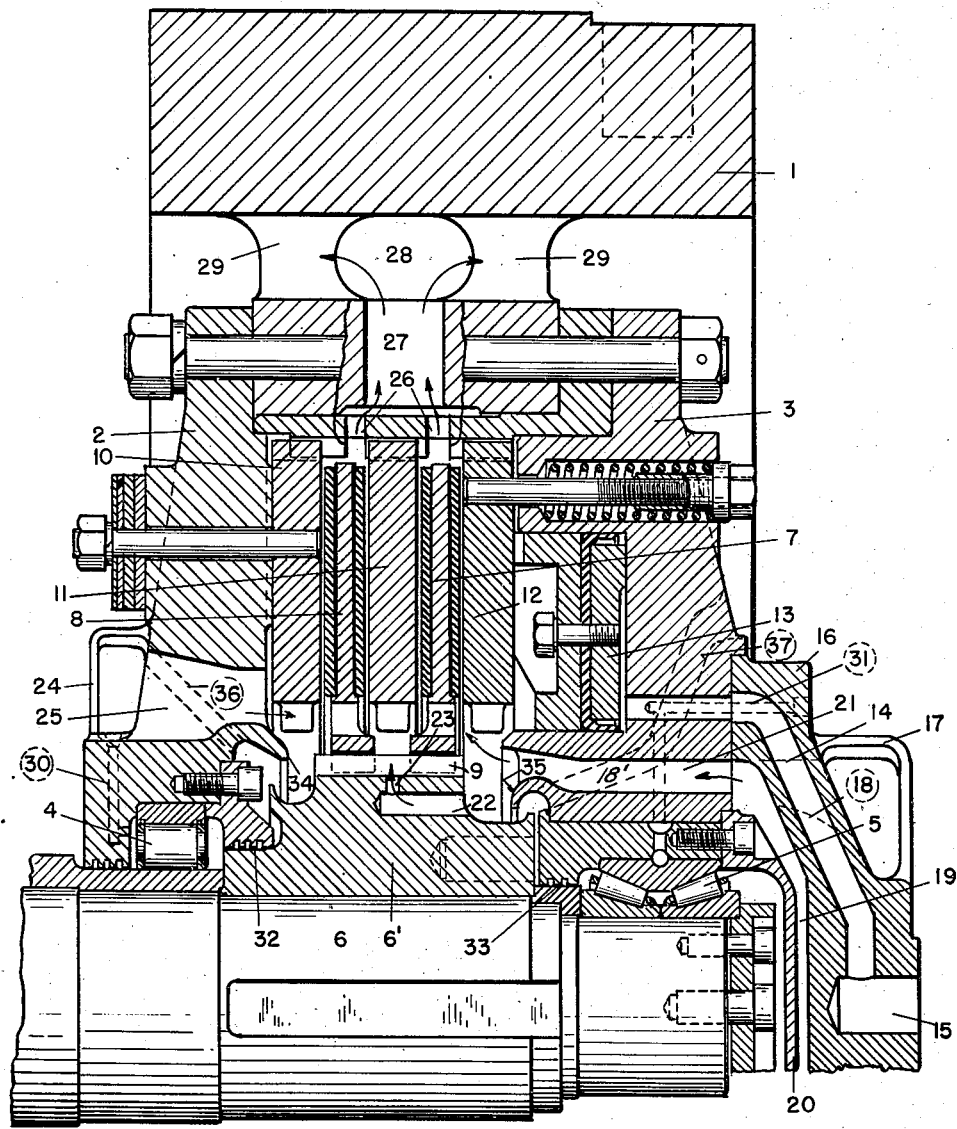

INVENTOR.
WILLIAM W. CRILEY

July 21, 1942.  W. W. CRILEY  2,290,542
CLUTCH
Filed March 7, 1940  2 Sheets-Sheet 2
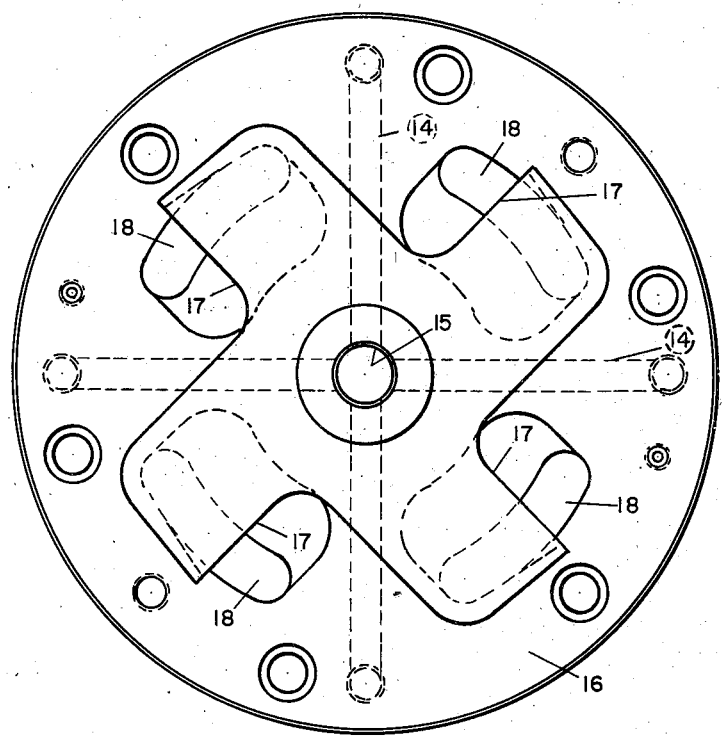
FIG.2.
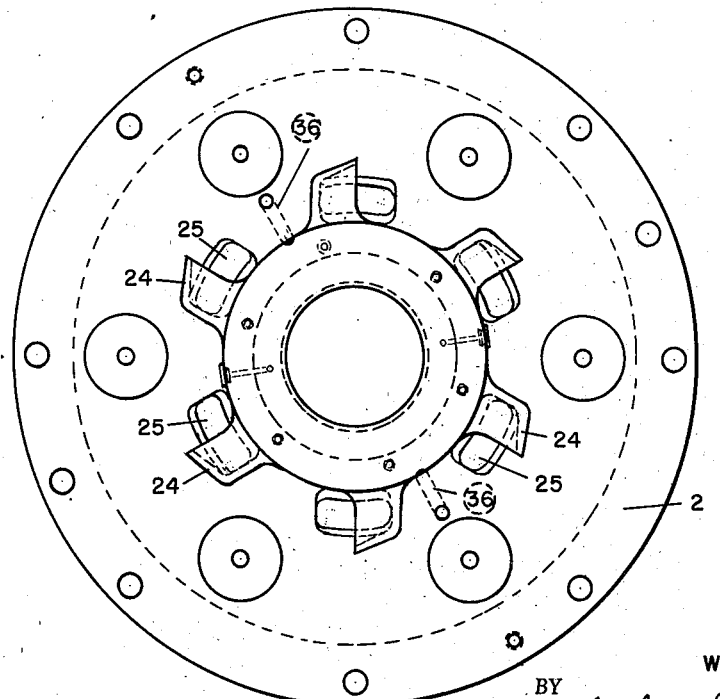
FIG_3
INVENTOR.
WILLIAM W. CRILEY.
BY
Oberlin, Limbach & Day
ATTORNEYS.

Patented July 21, 1942

2,290,542

UNITED STATES PATENT OFFICE 2,290,542

CLUTCH

William W. Criley, Shaker Heights, Ohio, assignor to The Ajax Manufacturing Company, Cleveland, Ohio, a corporation of Ohio Application March 7, 1940, Serial No. 322,719

6 Claims. (Cl. 192—113).

This invention relates to a clutch of the friction disk or plate type in which driving engagement of the driving and driven members is accomplished through the medium of packing or pressing said plates in an axial direction against each other. This invention is also particularly applicable to that type of clutch employed in the drive mechanism for metal working machines, such as presses and forging machines. In such clutches, as used in metal working machine drives, the clutch unit is usually mounted upon the drive shaft of the machine and embodies an inertia member, such as a fly-wheel or a drive gear, as the driven member of the clutch. The driving member of the clutch is thus rotatably mounted, by means of bearings, on the driven member or drive shaft portion of the clutch unit.

Such a clutch construction of the type above indicated has heretofore presented two interrelated problems having to do with improved operation and design. It has, of course, been generally recognized in the pertinent field of the art, that the dissipation of the heat of friction generated by the engagement of the clutch disks and related parts, is a desirable object. A further problem has confronted the art incident to the escaping of excess lubricant from the bearings supporting the driving member of the clutch. When such excess lubricant escapes into the interior of the clutch, it is thrown out centrifugally and comes in contact with the engaging surfaces of the friction-engaging plates or disks, thereby substantially affecting the efficient operation of the clutch. Oil-sealing devices have been utilized as an expedient toward curing this latter difficulty. However, even when such devices are used, there still exists the possibility of oil or lubricant leakage, particularly after continued use and wear. I have determined in the practice of my present invention, that it is the safer and better advised expedient to recognize the leakage of excess oil or lubricant from the bearings into the interior of the clutch as a constantly present problem, and to solve this problem by conducting such excess lubricant to the exterior of the clutch before it has the opportunity of producing any damaging effects by coming in contact with the friction-engaging surfaces thereof.

When it is attempted to provide means for circulating a stream or flow of cooling air through the engaging parts of such a clutch, in order to dissipate heat of friction, and to combine such an air cooling means with means for educting or throwing out excess lubricant from the bearings, the problem again naturally arises of preventing the incoming air stream from interfering with or entraining the outgoing lubricant.

It is, therefore, the general object and nature of my invention to, first, provide an improved means for circulating a stream of cooling air into the clutch and past the friction-engaging surfaces in order to effectively dissipate the heat of friction generated therein; secondly, to provide means for forcibly educting or throwing out, through the medium of centrifugal force, excess lubricant escaping to the interior of the clutch from the bearings; and finally, to so combine and arrange these two air inducting and lubricant educting means in the clutch assembly, that they will not disadvantageously interfere, one with the other, but, on the contrary, will contribute to the over-all efficiency, life of operation, practicability and reduction in service cost of the clutch unit.

To the accomplishment of the foregoing and related ends, said invention, then, consists of the means hereinafter fully described and particularly pointed out in the claims, the annexed drawings and the following description setting forth in detail certain mechanism embodying the invention, such disclosed means constituting, however, but one of various mechanical forms in which the principle of the invention may be used.

In said annexed drawings—

Fig. 1 is an elevational, sectional view of a clutch having a construction embodying the principle of my invention, and taken from the center line of the driven shaft to the outer periphery of the driving member; Fig. 2 is a right-hand end elevational view of a portion of the clutch shown in Fig. 1; and Fig. 3 is a lefthand end elevational view of the same.

Now referring more particularly to the drawings, the construction shown therein comprises a clutch driving member in the form of a fly-wheel 1 having substantially radially disposed side walls 2 and 3. The latter are, in turn, rotatably mounted by means of the bearings 4 and 5 respectively, upon the driven shaft 6. The fly-wheel 1 and the side walls 2 and 3 thus, in effect, constitute a driving housing member within which the engaging and actuating elements of the clutch are enclosed. Thus, the driven plates 7 and 8 are carried by the driven shaft 6, such as by means of the key-ways or splines 9. These driven plates are alternately mounted between the driving plates 10, 11 and 12. The latter, of course, are carried by the driving member of the clutch.

The above-mentioned driven plates 7 and 8 and driving plates 10, 11 and 12 are pressed or packed into frictional, driving engagement with each other by means of the annular piston 13 actuated by fluid pressure introduced through the channels 14 leading from the inlet 15 disposed at the center of the end plate or cap 16.

It is well known in the art, that as the friction-engaging elements, comprising the plates 7, 8, 10, 11 and 12, are pressed into engagement with each other in order to drivably connect the driving and driven elements of the clutch, that a substantial amount of heat of friction is generated. The dissipation of such heat of friction is hence desirable, as among other things, it promotes the life and efficiency of the parts of the clutch subjected to greatest wear and permits the clutch to operate with relatively greater loads.

My invention, therefore, provides means for inducing a stream of cooling air from the exterior of the clutch and at a point near its axis, or at a radially inward point, thence conducting such stream of air past the friction-engaging plates, viz., from their inner to outer peripheries, and then exhausting such air to the exterior of the clutch housing. Air intake buckets or scoops 17 are provided on the outer wall of the end plate 16. As will be noted from Fig. 2, the open ends of these buckets 17 are all disposed in the same relative circumferential direction, i. e., the direction of rotation of the driving member of the fly-wheel 1 of the clutch. Substantially radially disposed passages 18 lead from the air scoops 17, through the cap 16, to the circular space 19 formed by the outer wall of the bearing cap 20 and the inner wall of the end cap 16. Substantially axially parallel passages 18' in the side wall portion 3 of the clutch housing driving member, are disposed in alignment with the inner passages 18, and lead to a point adjacent the radially inner end of the driving plate 12. Axially parallel passages 22 (only one of which is shown but several of which are actually provided) are located in the hub 6' on the driven shaft 6, and lead to the short radial passage or port 23 located opposite the radially inner end of the intermediate driving plate 11. Air scoops 24 are also provided on the side wall housing 2 of the clutch and communicate through the axially parallel passages 25 to a point adjacent the inner end of the driving plate 10.

Radially disposed passages or ports 26 lead from adjacent the radially outer ends of the plates 7, 8, 10, 11 and 12 and communicate with the larger radial passage 27 leading to the annular chamber 28, to the outlet passages 29 in the fly-wheel 1.

Thus, it will be seen that the air introduced through the air scoops 17 and 24 follows first, a substantially axially parallel path (as indicated by the small arrows) to a point adjacent the inner ends of the driving and driven plates 7, 8, 10, 11 and 12, whence it travels in a centrifugal direction past the plates, to produce the cooling action or dissipation of the heat of friction, and then is discharged through the outlets 29. The air scoops 17 and 24 impart an initial induction force to the stream of air, which force is augmented by centrifugal force as the direction of this stream of air is correspondingly changed.

Lubricant ducts 30 and 31 communicate with the bearings 4 and 5 respectively. Lubricant is periodically forced through these ducts to the bearings in the customary manner. Even though lubricant seals 32 and 33 are provided on the inner ends of the bearings, it has been found that some of the lubricant will escape to the interior of the clutch assembly, where, if it then comes in contact with the friction-engaging plates, will seriously affect the efficiency of their operation. I have, therefore, provided overhanging annular lips 34 and 35, which are in substantially radial alignment with the inner ends of the bearings 4 and 5 and are adapted to collect any excess lubricant escaping at such inner ends, or alternatively, past the sealing devices 32 and 33. In order to safely conduct such excess lubricant which is collected by the overhanging lips 34 and 35, there are provided the drain passages 36 and 37, respectively, leading to the outer faces of the clutch side walls 2 and 3. It will be noted that the oil discharge passages 36 and 37 extend away from the axis of the clutch, so that centrifugal force is utilized in aiding the lubricant eduction action. Furthermore, it will be noted that the inner ends of the axially parallel air intake passages 21 and 25 terminate radially beyond the overhanging lips 35 and 34, respectively, so that there is afforded no opportunity of entraining any lubricant in the air circulating stream. Likewise, the outer ends of the lubricant discharge passages 36 and 37, respectively, are located radially beyond the air scoops 24 and 17, respectively, so that there will be no opportunity for entraining the discharged lubricant back into the cooling air stream as it is initially drawn into the interior of the clutch.

Other modes of applying the principle of my invention may be employed instead of the one explained, change being made as regards the mechanism herein disclosed, provided the means stated by any of the following claims or the equivalent of such stated means be employed.

I, therefore, particularly point out and distinctly claim as my invention:

1. A clutch comprising a driving housing member, a driven shaft member, bearings supporting said housing member on said driven member, air inlets located in the side wall of said housing member, air intake passages leading from said inlets through said housing member to the interior thereof at points radially outward of said bearings, and lubricant eduction passages spaced circumferentially with respect to said air intake passages said eduction passages and said intake passages being both located in the same side wall of said housing member, said eduction passages leading from adjacent the inner ends of said bearings to the exterior of said housing member for educting excess lubricant escaping from said bearings, the respective ends of said eduction passages being separated from said air intake passages for preventing entrainment of lubricant in the air in said intake passage.

2. A clutch comprising a driving housing member, a driven shaft member, bearings supporting said housing member on said driven member, air inlets located in the side wall of said housing member, air intake passages leading from said inlets through said housing member to the interior thereof at points radially outward of said bearings, an annular lip in the interior of said housing member overlying inner ends of said bearings and adapted to collect excess lubricant escaping therefrom, and lubricant eduction passages spaced circumferentially with respect to said air intake passages said eduction passages and said intake passages being both located in the same radial side wall of said housing member, the inner ends of said air intake passages terminating at a point radially beyond said annular lip and the outer ends of said eduction passages terminating at a point radially beyond said air inlets to prevent entrainment of lubricant in the air flowing through said intake passages.

3. A clutch comprising a driving housing member, a driven shaft member, bearings supporting said housing member on said driven member, air inlets located in the side wall of said housing member, air intake passages leading from said inlets through said housing member to the interior thereof at points radially outward of said bearings, and lubricant eduction passages spaced circumferentially with respect to said air intake passages said eduction passages and said intake passages being both located in the same side wall of said housing member, said eduction passages leading from adjacent the inner ends of said bearings to the exterior of said housing member for educting excess lubricant escaping from said bearings, said eduction passages extending in a substantially centrifugal direction from their inner to outer ends, and said air intake passages extending in a substantially axial direction, the respective ends of said eduction passages being separated from said air intake passages for preventing entrainment of lubricant in the air in said intake passage.

4. A clutch comprising a driving housing member having spaced radial side wall portions, a driven shaft member, spaced bearings mounting said side portions on said driven member, friction-engaging plates carried by said shaft member and located intermediate said bearings, axially parallel air intake passages extending through said side wall portions to a point adjacent the radially inner ends of said plates, radially extending air outlet passages leading from a point adjacent the radially outer ends of said plates to the exterior of said housing member, and lubricant eduction passages spaced circumferentially with respect to said air intake passages said eduction passages and said intake passages being both located in each of said side wall portions, said eduction passages leading from adjacent the inner ends of said bearings to the exterior of said housing member for educting excess lubricant escaping from said bearings, the respective ends of said eduction passages being separated from said air intake passages for preventing entrainment of lubricant in the air in said intake passage.

5. A clutch comprising a driving housing member having radial side wall portions, a driven shaft member, spaced bearings mounting said side portions on said driven member, friction-engaging plates carried by said shaft member and located intermediate said bearings, axially parallel air intake passages extending through said side wall portions to a point adjacent the radially inner ends of said plates, radially extending air outlet passages leading from a point adjacent the radially outer ends of said plates to the exterior of said housing member, annular lips positioned on the interior of said side wall portions and overlying the inner ends of said bearings, said lips being adapted to collect excess lubricant escaping from said bearings, and lubricant eduction passages, spaced circumferentially with respect to said air intake passages said eduction passages and said intake passages being both located in each of said side wall portions, the inner ends of said air intake passages terminating at a point radially beyond said annular lips, and the outer ends of said eduction passages terminating at a point radially beyond said air inlets to prevent entrainment of lubricant in the air flowing through said intake passages.

6. A clutch comprising a driving housing member having spaced radial sidewalls, a driven shaft, bearings mounting each of said sidewalls on said shaft, frictionally engageable clutching elements intermediate said sidewalls, cooling means for said clutching elements comprising axially parallel air intake passages extending through said sidewalls to the interior of said housing and terminating adjacent the inner edge of said clutching elements, and air outlet passages axially intermediate of and radially beyond said intake passages and the outer edge of said clutching elements, annular lips positioned on the interior of said sidewalls inwardly of said intake passages and overlying said bearings for collecting escaping lubricant, and lubricant eduction passages leading from said lips to the exterior of said housing member for educting the escaping lubricant to a point radially outward of said intake passages.

WILLIAM W. CRILEY.